US009457809B2

(12) United States Patent
Sasabuchi

(10) Patent No.: US 9,457,809 B2
(45) Date of Patent: Oct. 4, 2016

(54) COLLISION POSSIBILITY DETERMINATION APPARATUS, DRIVE ASSIST APPARATUS, COLLISION POSSIBILITY DETERMINATION METHOD, AND COLLISION POSSIBILITY DETERMINATION PROGRAM

(71) Applicant: HONDA MOTOR CO., LTD., Minato-Ku, Tokyo (JP)

(72) Inventor: Yoji Sasabuchi, Shioya-Gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/680,149

(22) Filed: Apr. 7, 2015

(65) Prior Publication Data
US 2015/0291159 A1 Oct. 15, 2015

(30) Foreign Application Priority Data

Apr. 14, 2014 (JP) .................. 2014-083176

(51) Int. Cl.
*B60W 30/095* (2012.01)
*G01S 13/86* (2006.01)
*G01S 13/93* (2006.01)
*G01S 13/72* (2006.01)
*G01S 13/34* (2006.01)

(52) U.S. Cl.
CPC ......... *B60W 30/0956* (2013.01); *G01S 13/723* (2013.01); *G01S 13/867* (2013.01); *G01S 13/931* (2013.01); *B60W 2420/403* (2013.01); *B60W 2420/52* (2013.01); *B60W 2550/10* (2013.01); *G01S 13/34* (2013.01); *G01S 2013/9342* (2013.01); *G01S 2013/9346* (2013.01); *G01S 2013/9375* (2013.01)

(58) Field of Classification Search
CPC .................. B60W 30/0956; B60W 2550/10; B60W 2420/52; B60W 2420/403; G01S 13/867; G01S 13/931; G01S 13/723; G01S 2013/9375; G01S 13/34; G01S 2013/9342; G01S 2013/9346
USPC ............. 701/301, 1; 180/168, 169; 340/435; 342/47, 53
See application file for complete search history.

(56) References Cited

U.S. PATENT DOCUMENTS

2010/0109937 A1* 5/2010 Koike ................... G01S 13/931
   342/70
2014/0203925 A1* 7/2014 Augst ................... B60Q 9/007
   340/435

FOREIGN PATENT DOCUMENTS

JP         2012-173786 A    9/2012

* cited by examiner

*Primary Examiner* — Marthe Marc-Coleman
(74) *Attorney, Agent, or Firm* — Carrier Blackman & Associates, P.C.; William D. Blackman; Jingli Wang

(57) ABSTRACT

A collision possibility determination apparatus includes: an identifying part configured to detect an object and identify a location of the object; a first analysis part configured to predict a future location of the object based on information relating to the object output from the identifying part and generate first information indicating a possibility of colliding with the object based on the predicted future location of the object; a second analysis part configured to generate second information indicating a possibility of colliding with the object based on the location of the object identified by the identifying part; and a determination part configured to determine a possibility of colliding with the object based on both of the first information and the second information.

8 Claims, 11 Drawing Sheets

COLLISION POSSIBILITY DETERMINATION APPARATUS, DRIVE ASSIST APPARATUS, COLLISION POSSIBILITY DETERMINATION METHOD, AND COLLISION POSSIBILITY DETERMINATION PROGRAM

CROSS-REFERENCE TO RELATED APPLICATION

Priority is claimed on Japanese Patent Application No. 2014-83176, filed on Apr. 14, 2014, the contents of which are incorporated herein by reference.

BACKGROUND

1. Field of the Invention

The present invention relates to a collision possibility determination apparatus, a drive assist apparatus, a collision possibility determination method, and a collision possibility determination program.

2. Background

In the related art, a drive assist apparatus is known which includes: an obstacle detecting means that detects information relating to an obstacle; a margin time calculating means that calculates a margin time to the closest approach of a vehicle to the current location of the obstacle; a future location estimating means that estimates the future location of the obstacle when the margin time elapses; an avoidance target region setting means that sets an avoidance target region which the vehicle should avoid; and a running route setting means that sets a running route used to avoid the avoidance target region, wherein the avoidance target region setting means evaluates a collision risk potential with the obstacle in the future location and the periphery location of the future location and sets the avoidance target region based on the collision risk potential (for example, refer to Japanese Patent Application, Publication No. 2012-173786A).

SUMMARY

In the apparatus of the related art, the determination accuracy of a collision possibility may be insufficient.

In view of the foregoing, an object of an aspect of the present invention is to provide a collision possibility determination apparatus, a drive assist apparatus, a collision possibility determination method, and a collision possibility determination program capable of enhancing the determination accuracy of a collision possibility.

(1) A collision possibility determination apparatus according to an aspect of the present invention includes: an identifying part configured to detect an object and identify a location of the object; a first analysis part configured to predict a future location of the object based on information relating to the object output from the identifying part and generate first information indicating a possibility of colliding with the object based on the predicted future location of the object; a second analysis part configured to generate second information indicating a possibility of colliding with the object based on the location of the object identified by the identifying part; and a determination part configured to determine a possibility of colliding with the object based on both of the first information and the second information.

(2) In the aspect of the above (1), the collision possibility determination apparatus may be provided on a vehicle, and the first analysis part may generate the first information based on a value which increases in accordance with an overlap amount between the future location of the object and an intended travel path of the vehicle.

(3) In the aspect of the above (1) or (2), the collision possibility determination apparatus may be provided on a vehicle, and in a case where a right end portion of the object viewed from the vehicle is on the right side of a first virtual line that extends from a left end of the vehicle in a travel direction of the vehicle and a left end portion of the object viewed from the vehicle is on the left side of a second virtual line that extends from a right end of the vehicle in the travel direction of the vehicle, the first analysis part may generate the first information based on a smaller one of a distance between the first virtual line and the right end portion and a distance between the second virtual line and the left end portion.

(4) In the aspect of any one of the above (1) to (3), the second analysis part may generate a value having a tendency of being increased with the decrease of a lateral location of the object obtained from the location of the object identified by the identifying part, as the second information.

(5) In the aspect of any one of the above (1) to (4), the first analysis part may generate the first information by integrating values generated by the first analysis part, and/or the second analysis part may generate the second information by integrating values generated by the second analysis part.

(6) In the aspect of any one of the above (1) to (5), the first information, the second information, or a determination result by the determination part may be adjusted based on a distance between the collision possibility determination apparatus and the object or a collision time between the collision possibility determination apparatus and the object.

(7) A drive assist apparatus according to another aspect of the present invention is provided on a vehicle, the drive assist apparatus including: the collision possibility determination apparatus according to any one of the above (1) to (6); and a drive assist part configured to perform a drive assist of the vehicle based on a determination result of the determination part of the collision possibility determination apparatus.

(8) A collision possibility determination method according to still another aspect of the present invention includes: based on information relating to an object, predicting a future location of the object; generating first information indicating a possibility of colliding with the object based on the predicted future location of the object; generating second information indicating a possibility of colliding with the object based on a location of the object; and determining a possibility of colliding with the object based on both of the first information and the second information.

(9) According to still another aspect of the present invention, there is provided a non-transitory computer-readable recording medium including a collision possibility determination program for causing a computer to: based on information relating to an object, predict a future location of the object; generate first information indicating a possibility of colliding with the object based on the predicted future location of the object; generate second information indicating a possibility of colliding with the object based on a location of the object; and determine a possibility of colliding with the object based on both of the first information and the second information.

According to the aspect of the above (1), (8), and (9), since it is possible to determine a possibility of colliding with an object based on both values of first information generated by the first analysis part and second information generated by the second analysis part, the first analysis part being configured to predict a future location of the object and generate the first information indicating a possibility of colliding with the object based on the predicted future location of the object, and the second analysis part being configured to generate the second information indicating a possibility of colliding with the object based on a location of the object, it is possible to enhance the determination accuracy of a collision possibility.

According to the aspect of the above (6), since the determination part adjusts the first information, the second information, or a determination result by the determination part based on a distance to the object or a collision time, it is possible to further enhance the determination accuracy of a collision possibility.

According to the aspect of the above (7), since the drive assist part performs a drive assist of the vehicle based on a determination result of the determination part, the driver can avoid collision with the object, and it is possible to secure the safety of the driver.

DESCRIPTION OF THE EMBODIMENTS

First Embodiment

Configuration

Hereinafter, a drive assist apparatus 1 including a collision possibility determination apparatus 5 according to embodiments of the present invention will be described with reference to the drawings.

Figure 1:
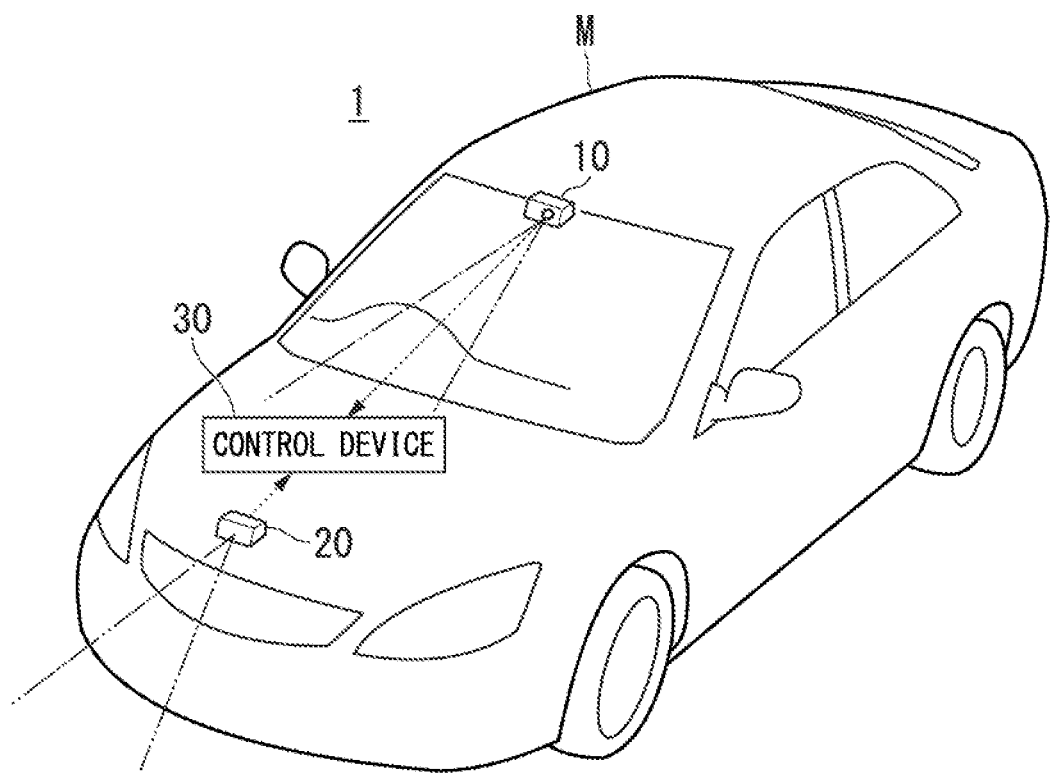
FIG. 1 is a diagram schematically showing an example of a configuration of a drive assist apparatus including a collision possibility determination apparatus according to a first embodiment.

FIG. 1 is a diagram schematically showing an example of a configuration of a drive assist apparatus 1 including a collision possibility determination apparatus 5 according to a first embodiment of the present invention. The drive assist apparatus 1 is, for example, an apparatus provided on a vehicle M and includes a camera 10, a radar device 20, and a control device 30.

The camera 10 is, for example, a digital camera attached to the upper portion of a front windshield, the back surface of a rearview mirror, or the like and using a solid-state imaging device such as a CCD (Charge Coupled Device) and a CMOS (Complementary Metal Oxide Semiconductor). For example, the camera 10 repeatedly captures the image ahead of the vehicle at predetermined intervals and outputs image data of the captured image to the control device 30.

The radar device 20 is, for example, attached to the back side of an emblem plate of the vehicle M, the periphery of a bumper or a front grille, or the like. The radar device 20, for example, radiates a millimeter wave in the front direction of the vehicle M, receives a reflection wave reflected by the object ahead of the vehicle M, and thereby detects at least the location (distance and azimuth angle) of the object. Further, the radar device 20 may be a device capable of detecting a relative speed to the object. The radar device 20, for example, detects the location or speed of the object by use of a FM-CW (Frequency-Modulated Continuous-Wave) method and outputs a detection result to the control device 30.

The control device 30 is, for example, a computer device in which an internal bus connects among a processor such as a CPU (Central Processing Unit), a storage device such as a ROM (Read Only Memory), a RAM (Random Access Memory), a HDD (Hard Disk Drive), an EEPROM (Electrically Erasable Programmable Read-Only Memory), and a flash memory, a communication interface for performing communication with other devices in the vehicle, and the like.

Figure 2:
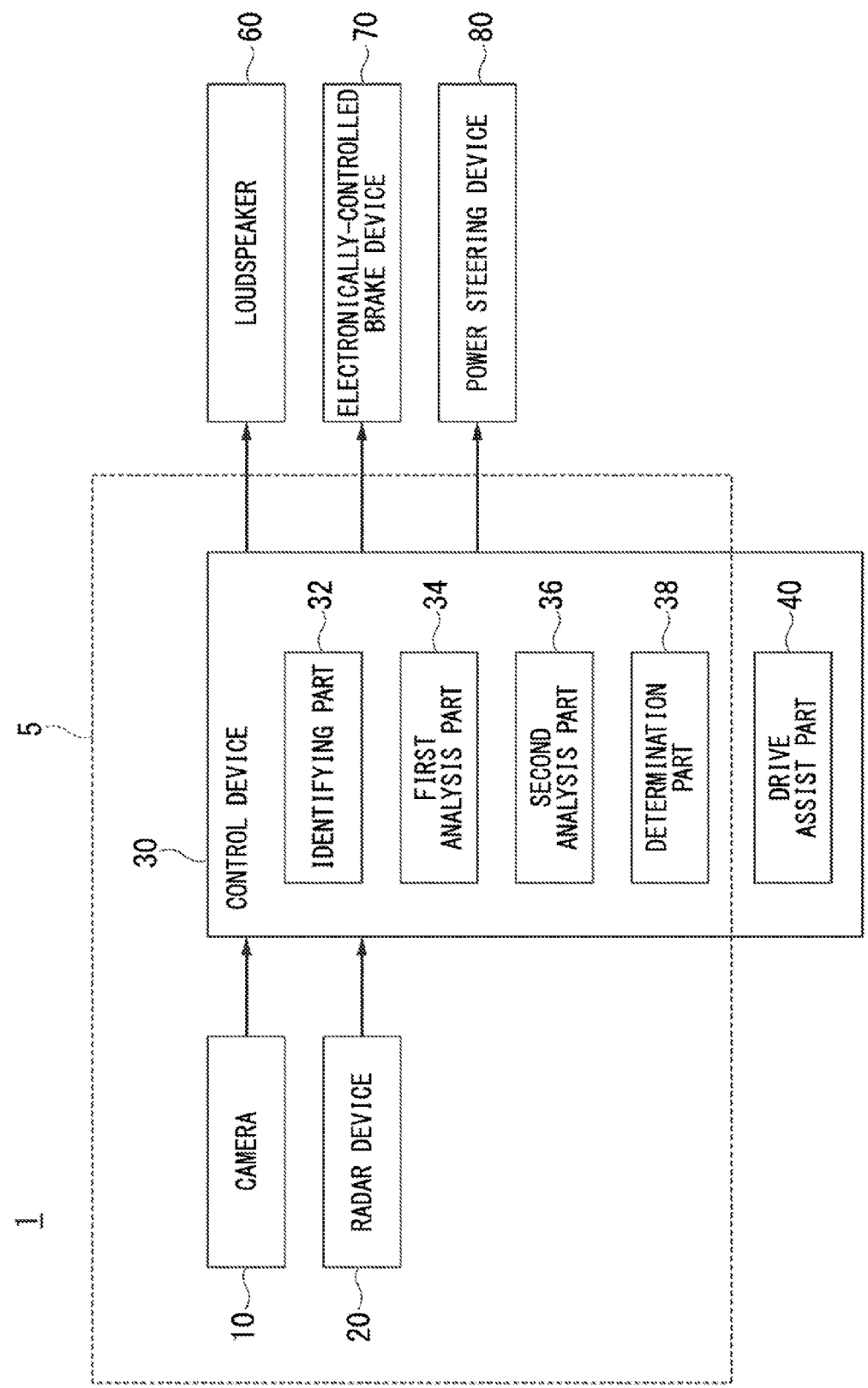
FIG. 2 is diagram showing a functional configuration example of the drive assist apparatus including the collision possibility determination apparatus.

FIG. 2 is a diagram showing a functional configuration example of the drive assist apparatus 1 including the collision possibility determination apparatus 5. The control device 30 includes an identifying part 32, a first analysis part 34, a second analysis part 36, a determination part 38, and a drive assist part 40 as a functional configuration. The functional parts are, for example, software functional parts that function by executing a program stored in the storage device by the processor. The program executed by the processor may be stored in the storage device in advance before shipping of the vehicle M. A program stored in a portable storage medium may be installed in the storage device of the control device 30 and may be executed by the processor. Further, the program may be downloaded from another computer device using an in-vehicle internet apparatus and may be installed in the storage device of the control device 30. Further, part of or all of the above functional parts may be a hardware functional part such as an LSI (Large Scale Integration) or an ASIC (Application Specific Integrated Circuit). Further, the drive assist part 40 may be realized by another computer different from other functional parts.

The identifying part 32 identifies, based on image data input from the camera 10 and the location of an object input from the radar device 20, the location of the object which is present in the front direction of the vehicle. The identifying part 32, for example, applies an edge point extraction process or the like on image data input from the camera 10 to thereby extract the object included in the image and converts the location on the image of the object into a location on a real space to thereby detect the location of the object. The identifying part 32 integrates the location of the object obtained by such an image analysis and the location of the object input from the radar device 20 and identifies the location of the object which is present in the front direction of the vehicle. Here, of the elements constituting the location of the object, the distance can be detected accurately by the radar device 20, and the lateral location (offset amount relative to the travel direction of the vehicle) can be detected accurately by the image analysis of the camera 10. Therefore, the identifying part 32 may identify the distance by using the input from the radar device 20 with emphasis and may identify the lateral location by using the result of the image analysis of the camera 10 with emphasis.

Figure 3:
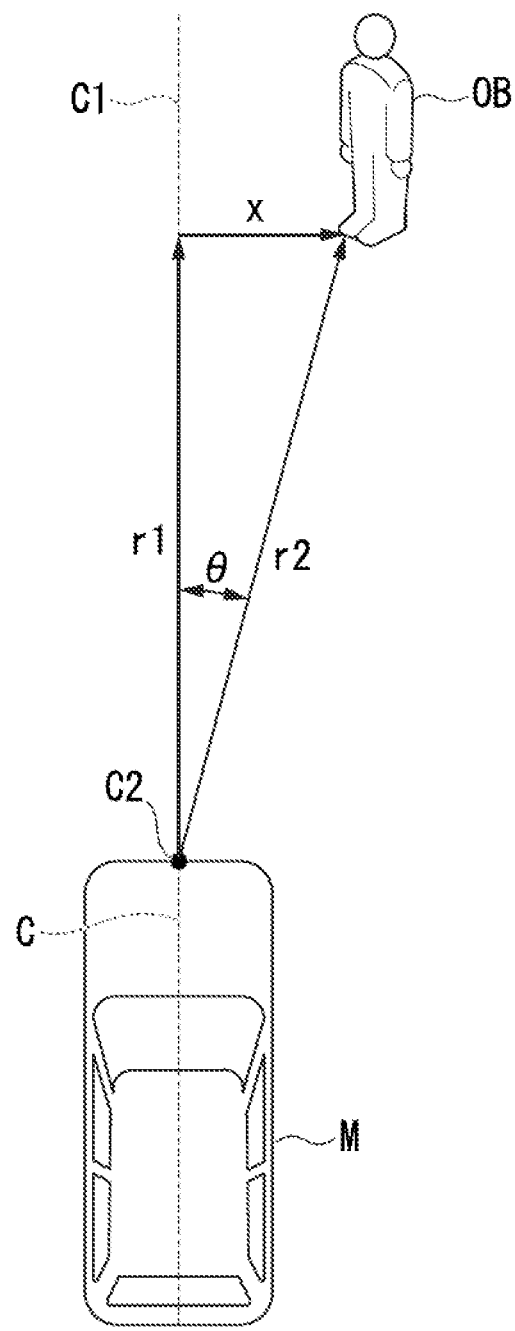
FIG. 3 is a diagram showing an example of a relationship among a vehicle, an object, a distance r, a lateral location x, and an azimuth θ.

FIG. 3 is a diagram showing an example of a relation among the vehicle M, an object OB, a distance r, a lateral location x, and an azimuth θ. The distance r may be defined by a distance r1 between a vehicle front end portion C2 and a position obtained by projecting the object OB on a virtual line C1, the virtual line C1 being obtained by extending a vehicle central axis C. Alternatively, the distance r may be defined by an actual distance r2 between the vehicle front end portion C2 and the object OB. In the following description, the distance r is defined by the distance r1. Further, the lateral location x is defined by the shortest distance between the object OB and the virtual line C1. The azimuth θ is defined by an angle of the direction of the object OB viewed from the vehicle front end portion C2 relative to the virtual line C1.

Note that, the functional part corresponding to the identifying part 32 may be realized by a computer device embedded in or attached to the camera 10. Further, the method of identifying the location of the object OB using both of the camera 10 and the radar device 20 is just an example. The drive assist apparatus 1 may identify the location of the object OB using only the radar device 20. Alternatively, the drive assist apparatus 1 may identify the location of the object OB using a stereo camera.

The first analysis part 34 predicts a future location of an object based on information relating to the object output from the identifying part 32 and calculates first information indicating a possibility of colliding with the object based on the predicted future location of the object. The first information is, for example, a value indicating a possibility of colliding with the object (for example, a value represented by 0 to 100). In addition, the first information may be information obtained by ranking a possibility of colliding with the object (for example, A, B, and C).

The second analysis part 36 calculates second information indicating a possibility of colliding with the object based on the location of the object identified by the identifying part 32. Similarly to the first information, the second information also may be a value indicating a possibility of colliding with the object, or may be information obtained by ranking a possibility of colliding with the object. Hereinafter, each of the first information and the second information is a value indicating a possibility of colliding with the object. The first analysis part 34 "calculates" the first information. The second analysis part 36 "calculates" the second information.

The determination part 38 determines a possibility of colliding with the object based on both of the first information and the second information.

The drive assist part 40 performs a variety of vehicle controls based on a determination result of the determination part 38 of the collision possibility determination apparatus 5 such that the driver of the vehicle can safely drive. The drive assist part 40 outputs a signal used to output an alarm for notification of a collision possibility to the loudspeaker 60 based on a command signal from the determination part 38. Further, the drive assist part 40 performs, based on a command signal from the determination part 38, a control which causes the electronically-controlled brake device 70 to automatically output a braking force or a control which causes the power steering device 80 to automatically output a steering force.

The loudspeaker 60 outputs speech in response to the instruction signal from the control device 30.

The electronically-controlled brake device 70 includes: a master cylinder in which a brake operation applied to a brake pedal is transmitted as an oil pressure; a reservoir tank that reserves a brake fluid; a brake actuator that adjusts a brake force output to each wheel; a controller that controls these units; and the like. The controller of the electronically-controlled brake device 70 controls a brake actuator or the like such that a brake torque depending on the pressure of the master cylinder is output to each wheel. Further, the controller of the electronically-controlled brake device 70 controls a brake actuator or the like such that when a control signal is input from the control device 30, a brake torque having an intensity indicated by the control signal is output to each wheel. Note that, when the brake operation of the driver and the input of the control signal are performed at the same time, the controller of the electronically-controlled brake device 70 may give priority to the brake operation of the driver or may perform a control in which the input of the control signal is added to the brake operation of the driver. The electronically-controlled brake device 70 is not limited to the above-described electronically-controlled brake device which operates by the oil pressure and may be an electronically-controlled brake device which operates by an electric actuator.

The power steering device 80 includes, for example, an electric motor capable of giving a force to a rack-and-pinion mechanism and changing the direction of steering wheels, a steering torque sensor, a steering angle sensor that detects a steering angle (or actual steering angle), a controller that controls these units, and the like.

The controller of the power steering device 80 detects a steering torque which arises from the operation of the steering wheel by the driver, rotates the electric motor in the direction according to the steering torque, and thereby assists the steering operation of the driver. Further, when a control signal is input from the control device 30, the controller of the power steering device 80 drives the electric motor in the direction and with the intensity indicated by the control signal. Note that, when the steering operation of the driver and the input of the control signal are performed at the same time, the controller of the power steering device 80 may give priority to the steering operation of the driver or may perform a control in which the input of the control signal is added to the steering operation of the driver.

[Operation Flow]

Figure 4:
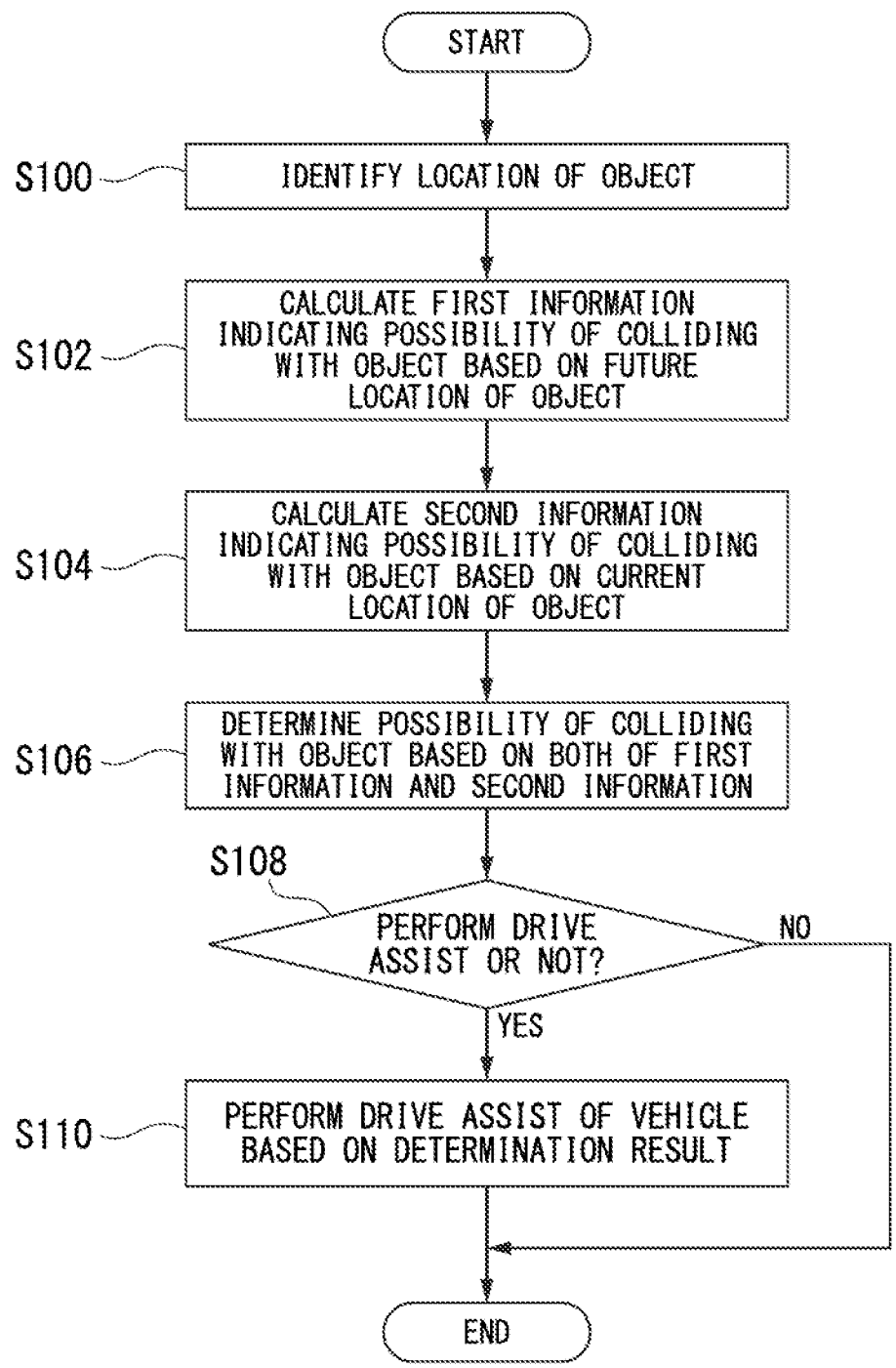
FIG. 4 is a flowchart showing an example of a flow of a process performed by a control device of the present embodiment.

FIG. 4 is a flowchart showing an example of a flow of a process performed by the control device 30 of the present embodiment. First, the identifying part 32 detects an object and identifies the location of the object (step S100). Next, the first analysis part 34 predicts, based on information relating to the object output by the identifying part 32, a future location of the object and calculates, based on the predicted future location of the object, first information indicating a possibility of colliding with the object (step S102). Next, the second analysis part 36 calculates second information indicating a possibility of colliding with the object based on the current location of the object identified by the identifying part 32 (step S104). Then, the determination part 38 determines a possibility of colliding with the object based on both of the first information and the second information (step S106). Then, the drive assist part 40 determines whether or not a drive assist of the vehicle should be performed based on the determination result of the determination part 38 (step S108). When the drive assist of the vehicle is performed, the drive assist part 40 performs the drive assist of the vehicle based on the determination result (step S110). Thus, the process of the present flowchart is finished.

[Calculation of First Information]

Figure 5:
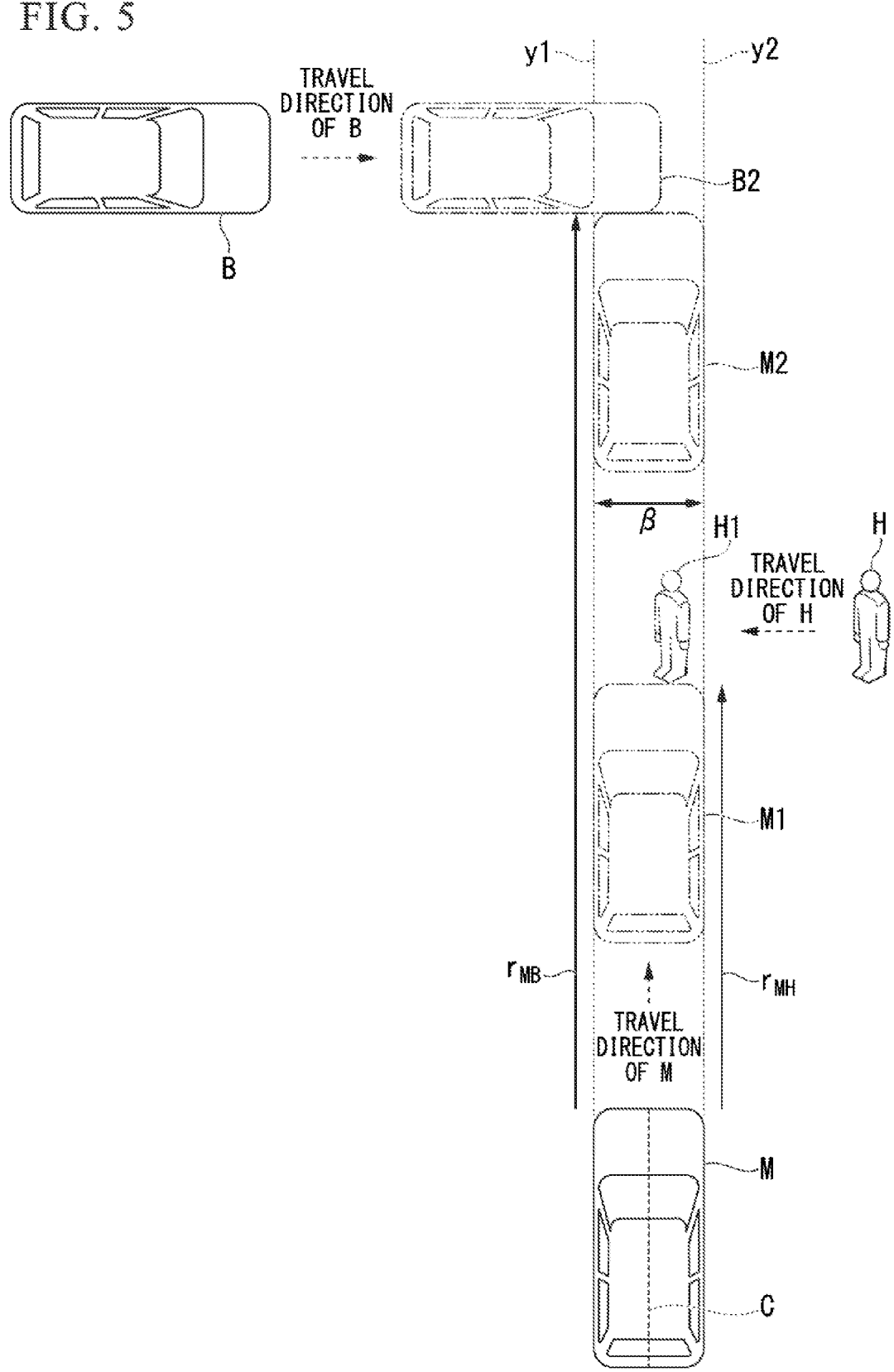
FIG. 5 is a diagram used to describe a process in which a first analysis part calculates first information.

The first information is calculated by the first analysis part 34. FIG. 5 is a diagram used to describe a process in which the first analysis part 34 calculates the first information. In FIG. 5, the vehicle M (first vehicle) travels in the travel direction (direction indicated by a dashed arrow) of the vehicle M, a second vehicle B (another vehicle) travels in the travel direction (direction indicated by a dashed arrow) of the second vehicle B, and a person H travels in the travel direction (direction indicated by a dashed arrow) of the person 1H. Here, a virtual line that extends from the left end of the vehicle M in parallel with a vehicle central axis C is defined as a first virtual line y1. A virtual line that extends from the right end of the vehicle M in parallel with the vehicle central axis C is defined as a second virtual line y2. An overlap region β formed in a section by the first virtual line y1 and the second virtual line y2 is an example that represents an intended travel path of the vehicle.

First, the first analysis part 34 identifies the travel direction and the travel speed of the second vehicle B and the person H based on information input from the camera 10 or the radar device 20. There is no particular limitation relating to identification of the travel direction or the travel speed. The first analysis part 34 may identify the travel direction or the travel speed based on the change of sequentially identified locations of the second vehicle B or the person H. Alternatively, the first analysis part 34 may identify the travel direction or the travel speed based on information of a relative speed input from the radar device 20.

Further, the first analysis part 34 predicts the location (future location) of the second vehicle B or the person H when a predetermined time elapses based on the above-identified travel direction and travel speed and calculates the first information based on the relation among the future location, the first virtual line y1, and the second virtual line y2. The predetermined time is, for example, set to a different value for each object. A predetermined time $T_H$ relating to the person H is, for example, a time obtained by dividing the distance $r_{MH}$ between the vehicle M and the person H by the speed of the vehicle M, that is, a time for the vehicle M to arrive at the vicinity of the location of the person H being present. Similarly, a predetermined time $T_B$ relating to the second vehicle B is, for example, a time obtained by dividing the distance $r_{MB}$ between the vehicle M and the second vehicle B by the speed of the vehicle M, that is, a time for the vehicle M to arrive at the vicinity of the location of the second vehicle B being present. In FIG. 5, H1 represents a future location of the person H when the predetermined time $T_H$ elapses, and B2 represents a future location of the second vehicle B when the predetermined time $T_B$ elapses.

In the example of FIG. 5, when the future location of the person H falls within the intended travel path of the vehicle M at the time of the vehicle M arriving at a future location M1, the first analysis part 34 determines that there is a collision possibility and calculates a positive value as the first information. On the other hand, when the future location of the person H does not fall within the intended travel path of the vehicle M at the time of the vehicle M arriving at a future location M1, the first analysis part 34 determines that a collision possibility is low and, for example, calculates a zero value as the first information. Note that, even when a collision possibility is low, the first analysis part 34 may calculate a certain small value as the first information. Similarly, when the future location of the second vehicle B falls within the intended travel path of the vehicle M at the time of the vehicle M arriving at a future location M2, the first analysis part 34 determines that there is a collision possibility and calculates a positive value as the first information. On the other hand, when the future location of the second vehicle B does not fall within the intended travel path of the vehicle M at the time of the vehicle M arriving at a future location M2, the first analysis part 34 determines that a collision possibility is low and, for example, calculates a zero value as the first information.

Figure 6:
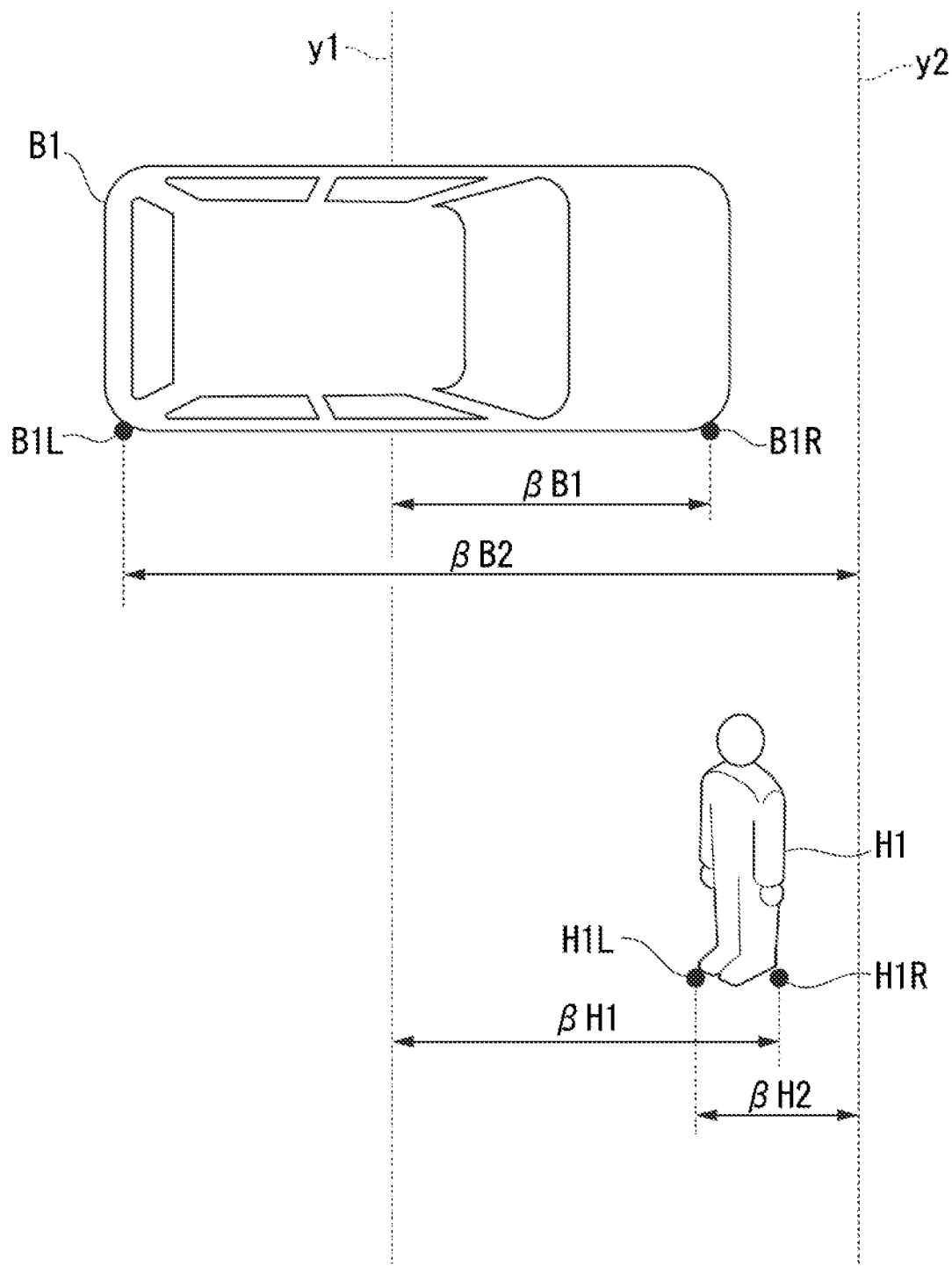
FIG. 6 is a diagram used to describe the process in which the first analysis part calculates the first information in more detail.

The process of the first analysis part 34 will be described in more detail. FIG. 6 is a diagram used to describe the process in which the first analysis part 34 calculates the first information in more detail. The first analysis part 34 calculates an overlap amount (described below) of the person H and the second vehicle B as a value for the basis of the first information. The first analysis part 34 calculates a value which increases in accordance with the overlap amount between the future location of the object such as the person H or the second vehicle B and the intended travel path of the vehicle M as the overlap amount. For example, in a case where the right end portion of the object viewed from the vehicle M is on the right side of the first virtual line y1 and the left end portion of the object viewed from the vehicle M is on the left side of the second virtual line y2, the first analysis part 34 calculates a smaller one of the distance between the first virtual line y1 and the right end portion and the distance between the second virtual line y2 and the left end portion as the overlap amount. Here, when the right end portion of the object viewed from the vehicle M is on the left side of the first virtual line y1 or when the left end portion of the object viewed from the vehicle M is on the right side of the second virtual line y2, since the future location of the object does not overlap with the intended travel path of the vehicle M, the overlap amount becomes zero.

In the example of FIG. 6, the first analysis part 34 calculates, with respect to the person H, a distance βH1 between the first virtual line y1 and a right end portion H1R and a distance βH2 between the second virtual line y2 and a left end portion H1L and calculates the βH2 which is the smaller one as an overlap amount of the future location H1 of the person H. Further, the first analysis part 34, with respect to the second vehicle B, calculates a distance βB1 between the first virtual line y1 and a right end portion B1R and a distance βB2 between the second virtual line y2 and a left end portion B1L and calculates the βB1 which is the smaller one as an overlap amount of the future location B1 of the second vehicle B. Here, as shown in the example of FIG. 6, when the left end portion B1L of the second vehicle B is on the left side of the virtual line y1, the βB2 may be replaced by an upper limit, the upper limit being the distance between the virtual line y1 and the virtual line y2 (when the right end portion is on the right side of the virtual line y2, the βB2 may be replaced in a similar manner).

Figure 7:
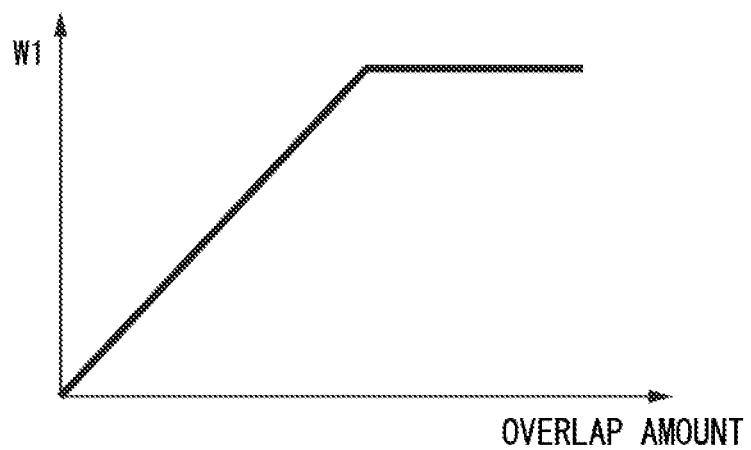
FIG. 7 is an example showing a relation between an overlap amount and a risk degree W1.

Then, the first analysis part 34 calculates a risk degree W1 having a tendency of being increased with the increase of the overlap amount as the first information. FIG. 7 is an example showing a relation between the overlap amount and the risk degree W1. In FIG. 7, the vertical axis represents the risk degree W1, and the horizontal axis represents the overlap amount. The greater overlap amount represents a higher possibility that the future location of the object overlaps with the intended travel path of the vehicle M. Accordingly, the first analysis part 34 calculates the risk degree W1 to be greater when the overlap amount becomes greater. Note that, in the example of FIG. 7, the first analysis part 34 calculates such that the risk degree W1 is maintained at a constant value when the overlap amount is a predetermined value or more. The relationship between the overlap amount and the risk degree W1 may be any relationship as long as the relationship has a tendency that the risk degree W1 becomes greater when the overlap amount becomes greater.

Note that, the first analysis part 34 may calculate the overlap amount for several times at predetermined intervals and may calculate the risk degree W1 according to a value obtained by adding or integrating the overlap amounts. Further, the first analysis part 34 may obtain an average of the values obtained by adding or integrating the overlap amounts and may calculate the risk degree W1. Further, even when the overlap amount is zero, the first analysis part 34 may calculate a predetermined small value which is more than zero as the risk degree W1.

[Calculation of Second Information]

Figure 8:
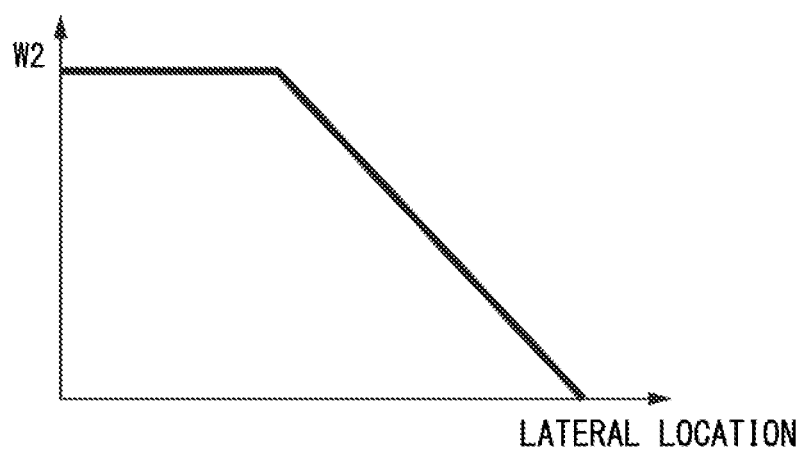
FIG. 8 is a diagram showing an example of a risk degree W2 having a tendency of being increased with the decrease of the lateral location.

The second information is calculated by the second analysis part 36. The second analysis part 36 generates the second information based on a lateral location of the second vehicle B or the person H input from the identifying part 32. More specifically, the second analysis part 36 calculates a risk degree W2 having a tendency of being increased with the decrease of the lateral location as the second information. FIG. 8 is a diagram showing an example of the risk degree W2 having a tendency of being increased with the decrease of the lateral location. In FIG. 8, the vertical axis represents the risk degree W2, and the horizontal axis represents the lateral location. Further, when the measure of the lateral location is a specific value or less, the risk degree W2 is maintained at a constant value. The smaller lateral location represents that the current location of the object is close to the intended travel path of the vehicle. Accordingly, the second analysis part 36 calculates the risk degree W2 having a tendency of being increased with the decrease of the lateral location.

Further, the second analysis part 36 may calculate the lateral location for several times at predetermined intervals and may calculate the risk degree W2 according to a value obtained by adding or integrating the lateral locations. Further, the second analysis part 36 may obtain an average of the values obtained by adding or integrating the lateral locations and may calculate the risk degree W2. Further, even when the lateral location is great, the second analysis part 36 may calculate a predetermined small value which is more than zero as the risk degree W2. Further, the second analysis part 36 may use acceleration, speed, or the like of the second vehicle B or the object as the calculation target of the lateral location for determination of the risk degree. The second information calculated by the second analysis part 36 may be one which uses the lateral location as an element to calculate the risk degree relating to the collision possibility.

Further, the above embodiment is described using an example in which the second analysis part 36 calculates the risk degree W2 based on the lateral location of the object; however, the second analysis part 36 may calculate the risk degree W2 based on an arbitrary value indicating deviation relative to the intended travel path of the vehicle M such as the distance from the object and the azimuth angle.

[Control Based on Both of First Information and Second Information]

The determination part 38 determines a possibility of the vehicle M colliding with the object based on both of the first information and the second information. The determination part 38 calculates a total risk degree W relating to a possibility of collision between the vehicle M and the object for example, by adding the first information to the second information or multiplying the first information by the second information. Further, the determination part 38 may calculate the total risk degree W by calculating a weighted average or the like of the first information and the second information.

Note that, the determination part 38 may adjust the calculated total risk degree W. For example, the determination part 38 may slightly adjust the total risk degree W when the distance between the vehicle M and the object, or a collision time (TTC; Time To Collision) is long. For example, the determination part 38 may greatly adjust the total risk degree W when the distance between the vehicle M and the object, or the collision time is short. In this way, in a highly urgent situation when the vehicle M and the object are located close to each other, by greatly adjusting the total risk degree W, it is possible to further enhance the determination accuracy of the collision possibility.

Figure 9:
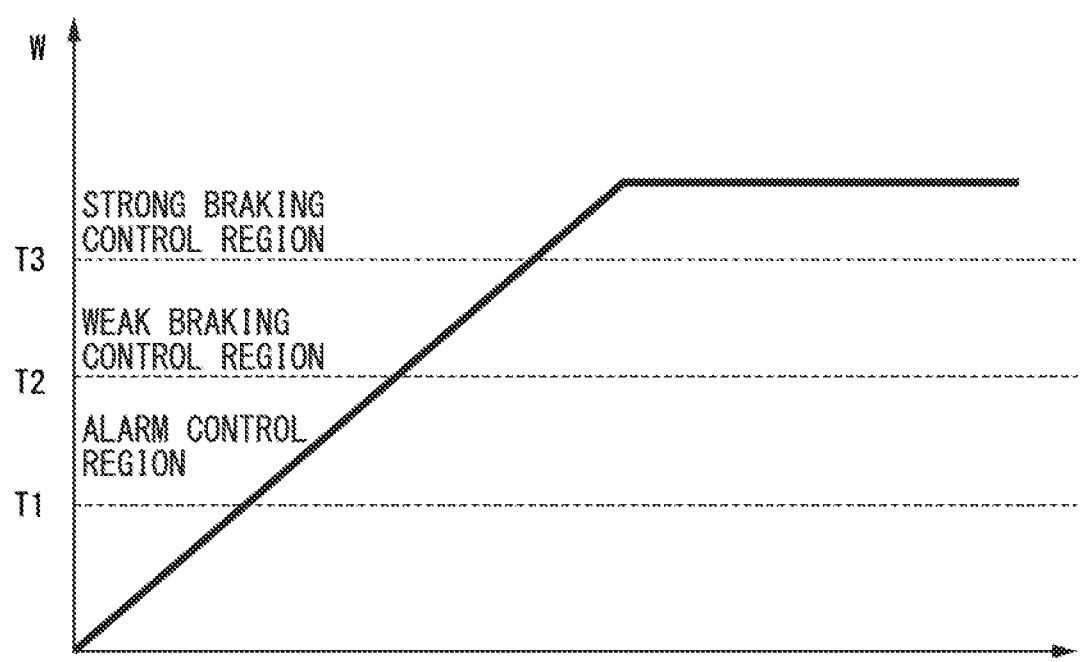
FIG. 9 is a diagram showing an example of a relation between a total risk degree W and a vehicle control performed by a drive assist part.

The drive assist part 40 performs a variety of vehicle controls based on the total risk degree W. FIG. 9 is a diagram showing an example of a relation between the total risk degree W and the vehicle control performed by the drive assist part 40. The drive assist part 40 controls the loudspeaker 60 or the electronically-controlled brake device 70, for example, so as to perform a vehicle control which is stronger in a step-by-step manner according to the increase of the total risk degree W. The drive assist part 40 outputs an alarm over the loudspeaker 60, for example, when the total risk degree W is a first threshold value T1 or more and is less than a second threshold value T2. The drive assist part 40 commands the electronically-controlled brake device 70 to output a relatively weak braking force, for example, when the total risk degree W is the second threshold value T2 or more and is less than a third threshold value T3. The drive assist part 40 commands the electronically-controlled brake device 70 to output a relatively strong braking force, for example, when the total risk degree W is the third threshold value T3 or more. Here, T1<T2<T3. In addition, the drive assist part 40 may command the power steering device 80, for example, to set the steering force of the power steering device 80 in multiple steps according to the increase of the total risk degree W and output the steering force according to the total risk degree W.

The above embodiment is described using an example in which the collision possibility determination apparatus 5 is provided on a vehicle; however, the collision possibility determination apparatus 5 may be provided on a portable phone, a fixing apparatus arranged at the roadside, or the like.

According to the collision possibility determination apparatus 5 of the first embodiment described above, since the first analysis part 34 predicts the future location of an object based on information relating to the object output from the identifying part 32 and calculates first information (risk degree W1) indicating a possibility of colliding with the object based on the predicted future location of the object, the second analysis part 36 calculates second information (risk degree W2) indicating a possibility of colliding with the object based on the location of the object identified by the identifying part 32, and the determination part 38 determines a possibility of colliding with the object based on both of the first information and the second information, it is possible to enhance the determination accuracy of a collision possibility. Further, according to the drive assist apparatus 1 of the present embodiment, since the drive assist part 40 performs a drive assist of the vehicle based on the determination result of the determination part 38, the drive assist apparatus 1 can contribute to safe driving.

Second Embodiment

Hereinafter, a second embodiment of the present invention is described. Here, a process of the first analysis part 34 which is the difference from the first embodiment, specifically the difference in the calculation method of the overlap amount is described; and the description of functions or the like in common with the first embodiment is omitted.

In the second embodiment, when the future location of the second vehicle B or the person H falls within a region between the first virtual line y1 and the second virtual line (hereinafter, referred to as an overlap region β), the first analysis part 34 calculates the first information such that the first information has a higher value when the future location is closer to the middle of the first virtual line y1 and the second virtual line y2. The first analysis part 34 sets a plurality of points which represent the object and calculates the distance from each of the points to the first virtual line y1 and the distance from each of the points to the second virtual line y2. Further, the first analysis part 34 selects the smaller one of the distance from each of the points to the first virtual line y1 and the distance from each of the points to the second virtual line y2, as an individual overlap amount. Then, the first analysis part 34 calculates the greatest individual overlap amount of the individual overlap amounts selected in each of the points, as the overlap amount of the future location of the object.

Figure 10:
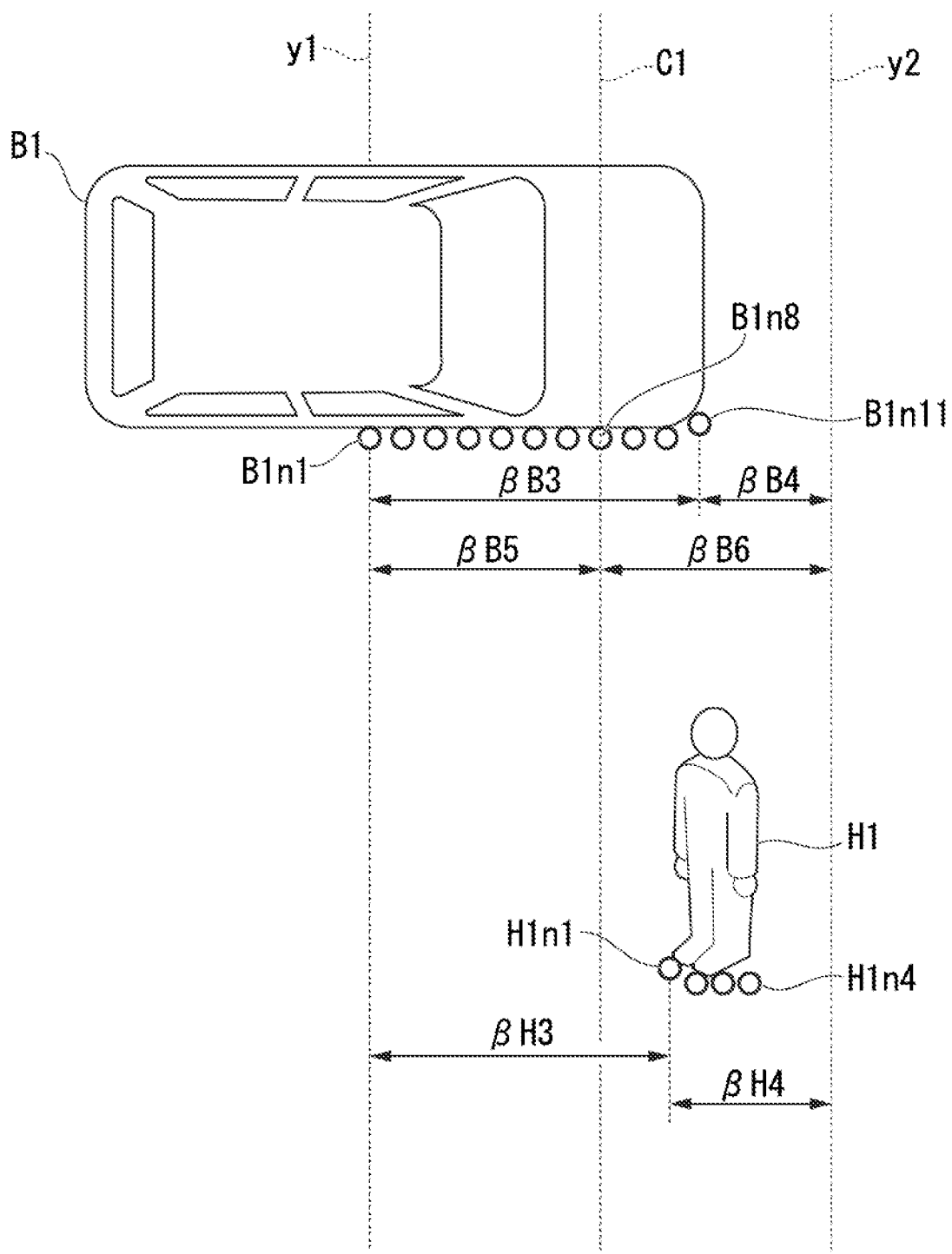
FIG. 10 is a diagram used to describe a method in which the first analysis part calculates the overlap amount according to a second embodiment.

FIG. 10 is a diagram used to describe a method in which the first analysis part 34 calculates the overlap amount according to the second embodiment. The first analysis part 34 sets a plurality of points B1$n$1 to B1$n$11 which represent the future location B1 of the second vehicle B. The first analysis part 34 calculates the distance from each of the points B1$n$1 to B1$n$11 set at the future location B1 of the second vehicle B to the first virtual line y1 and the distance from each of the points B1$n$1 to B1$n$11 to the second virtual line y2. For example, with respect to the point B1$n$11, the first analysis part 34 calculates a distance βB3 from the point B1$n$11 to the first virtual line y1 and a distance βB4 from the point B1$n$11 to the second virtual line y2 and selects the smaller distance β4 as the individual overlap amount.

Further, for example, with respect to the point B1$n$8, the first analysis part 34 calculates a distance βB5 from the point B1$n$8 to the first virtual line y1 and a distance βB6 from the point B1$n$8 to the second virtual line y2 and selects the distance βB5 which is any one of the distances, as the individual overlap amount (here, βB5 is equal to βB6). The first analysis part 34 performs the above process with respect to all of the points B1$n$1 to B1$n$11 and calculates the greatest individual overlap amount of the obtained individual overlap amounts, as the overlap amount of the future location B1 of the second vehicle B. In the example of FIG. 10, the first analysis part 34 calculates βB5 (βB6) as the overlap amount of the future location B1 of the second vehicle B.

Similarly, the first analysis part 34 performs calculation of the overlap amount of the future location H1 of the person H. The first analysis part 34 sets a plurality of points H1$n$1 to H1$n$4 which represent the future location H1 of the person H. For example, with respect to the point H1$n$1, the first analysis part 34 calculates a distance βH3 from the point H1$n$1 to the first virtual line y1 and a distance βH4 from the point H1$n$1 to the second virtual line y2 and selects the smaller distance βH4 as the individual overlap amount. The first analysis part 34 performs a similar process with respect to all of the points H1$n$1 to H1$n$4 and calculates the greatest individual overlap amount of the obtained individual overlap amounts, as the overlap amount of the future location H1 of the person H. In the example of FIG. 10, the first analysis part 34 calculates βH4 as the overlap amount of the future location H1 of the person H.

Figure 11:
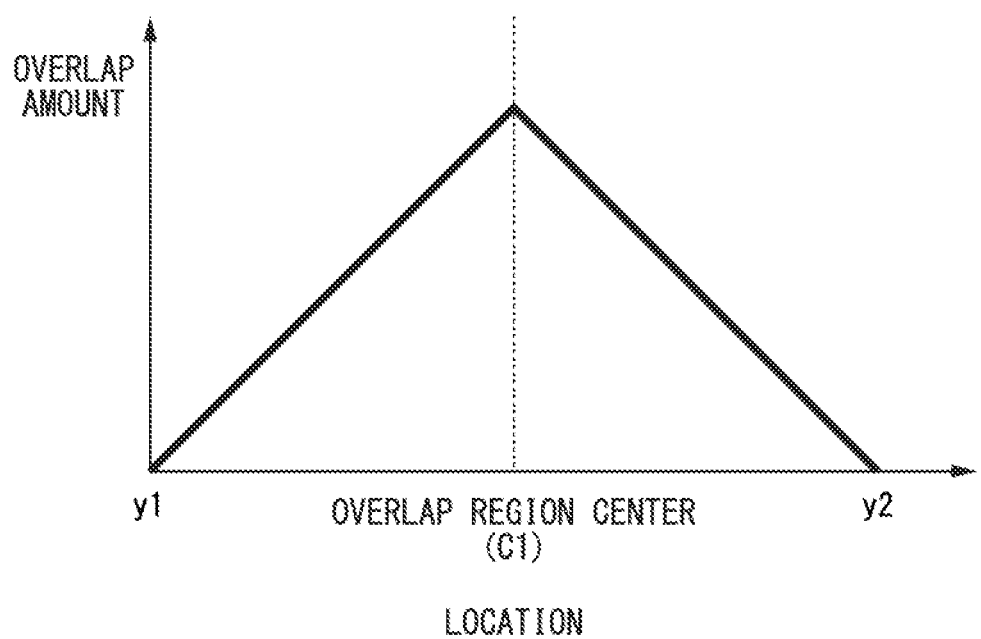
FIG. 11 is an example showing a relation between the overlap amount and a future location of the object in an overlap region.

The first analysis part 34 calculates the overlap amount having a tendency in which the overlap amount is increased according to the future location of the object approaching the center of the overlap region. FIG. 11 is an example showing a relation between the overlap amount and the future location of the object in the overlap region. In FIG. 11, the vertical axis represents the overlap amount, and the horizontal axis represents the future location of the object in the overlap region. The first analysis part 34, for example, calculates that the overlap amount is great when the future location of the object is positioned substantially at the center of the overlap region. The first analysis part 34, for example, calculates that the overlap amount is small when the future location of the object is positioned close to the first virtual line y1 or the second virtual line y2. The great overlap amount represents that the future location of the object is positioned at the center in the width direction (overlap region) of the intended travel path of the vehicle. Note that, as shown in FIG. 7, since the first analysis part 34 calculates the risk degree W1 to be greater when the overlap amount becomes greater, the first analysis part 34 calculates the risk degree W1 to be greater when the future location of the object is close to substantially the center of the overlap region.

According to the collision possibility determination apparatus 5 of the second embodiment described above, similarly to the first embodiment, it is possible to enhance the determination accuracy of a collision possibility.

Third Embodiment

Hereinafter, a third embodiment of the present invention is described. Here, a process of the first analysis part 34 which is the difference from the first embodiment, specifically the difference in the calculation method of the overlap amount is described; and the description of functions or the like in common with the first embodiment is omitted. In the third embodiment, the first analysis part 34 sets a plurality of points which represent the object and extracts a point which is the closest to the virtual line C1 of the plurality of points. Further, the first analysis part 34 calculates the distance to the first virtual line y1 and the distance to the second virtual line y2 based on the extracted point and sets the smaller one of the distances as the overlap amount of the future location of the object.

The calculation method of the overlap amount of the third embodiment is described with reference to FIG. 10. The first analysis part 34 extracts the point B1$n$8 which is the closest to the virtual line C1 of the points B1$n$1 to B1$n$11 set to the second vehicle B. The first analysis part 34 calculates the distance βB5 from the extracted point B1$n$8 to the first virtual line y1 and the distance βB6 from the extracted point B1$n$8 to the second virtual line y2. The first analysis part 34 calculates the distance βB5 which is any one of the calculated distance βB5 and distance βB6, as the overlap amount of the future location B1 of the second vehicle B (here, the distance βB5 is equal to the distance βB6).

Further, similarly, the first analysis part 34 extracts the point H1n1 which is the closest to the virtual line C1 of the points H1n1 to H1n4 set to the future location H1 of the person H and calculates the distance βH3 from the extracted point H1n1 to the first virtual line y1 and the distance βH4 from the point H1n1 to the second virtual line y2. The first analysis part 34 calculates the distance βH4 which is the smaller one of the calculated distance βH3 and distance βH4, as the overlap amount of the future location H1 of the person H. Note that, as shown in FIG. 7, since the first analysis part 34 calculates the risk degree W1 to be greater when the overlap amount becomes greater, the first analysis part 34 calculates the risk degree W1 to be greater when the future location of the object is close to substantially the center of the overlap region.

According to the collision possibility determination apparatus 5 of the third embodiment described above, similarly to the first embodiment, it is possible to enhance the determination accuracy of a collision possibility.

Fourth Embodiment

Hereinafter, a fourth embodiment of the present invention is described. Here, a process of the first analysis part 34 which is the difference from the first embodiment, specifically the difference in the calculation method of the overlap amount is described; and the description of functions or the like in common with the first embodiment is omitted. In the fourth embodiment, the first analysis part 34 calculates the width of the future location of the object such as the person H or the second vehicle B in the overlap region β, as the overlap amount.

Figure 12:
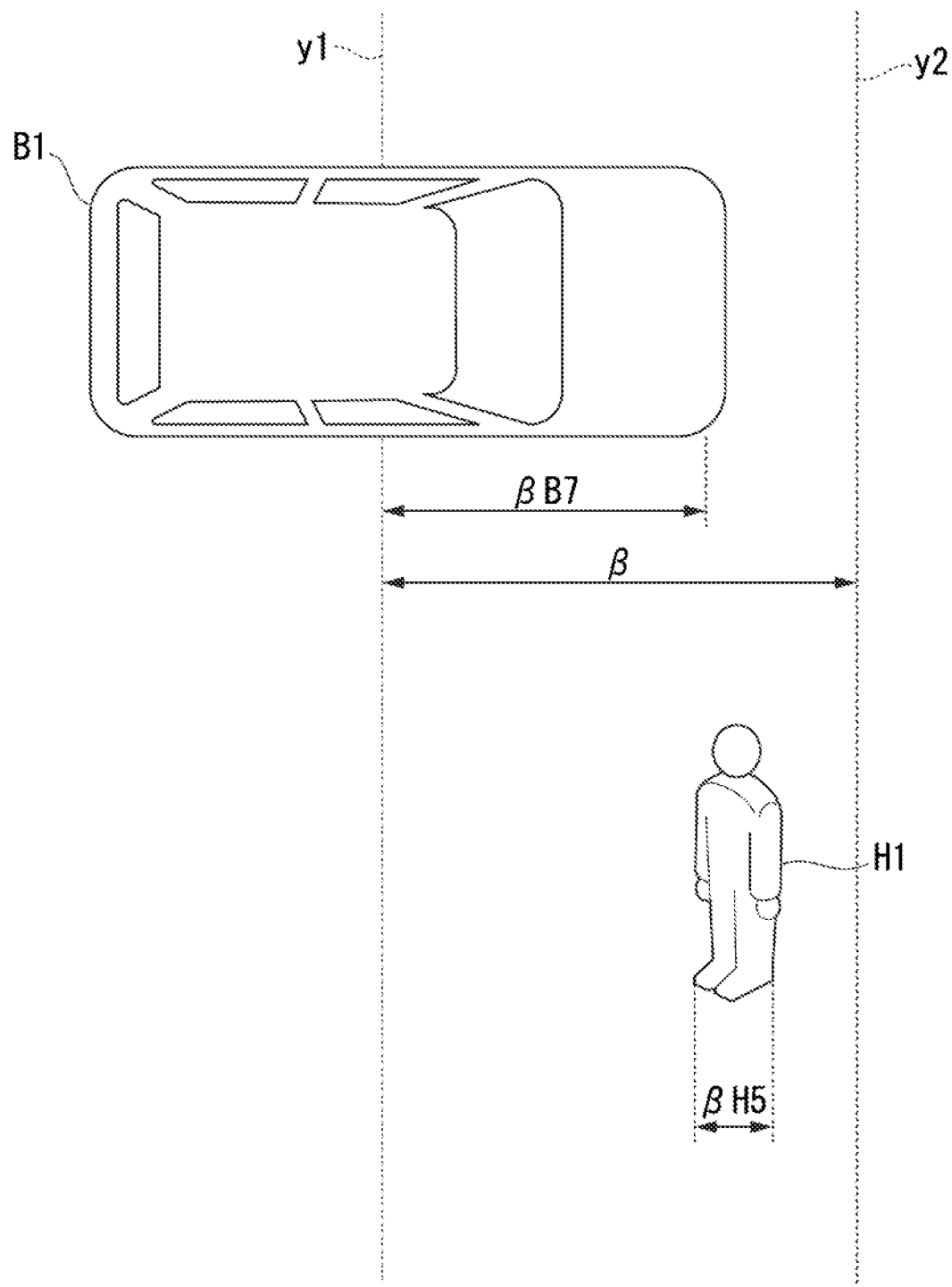
FIG. 12 is a diagram used to describe a method in which the first analysis part calculates the overlap amount according to a fourth embodiment.

FIG. 12 is a diagram used to describe a method in which the first analysis part 34 calculates the overlap amount according to the fourth embodiment. The first analysis part 34 calculates a width βB7 of the future location B1 of the second vehicle B in the overlap region β, as the overlap amount. Similarly, the first analysis part 34 calculates a width βH5 of the future location H1 of the person H in the overlap region β, as the overlap amount. Further, the first analysis part 34 may divide the width of the future location of the object in the overlap region β by the width of the overlap region β and may calculate the obtained value of 0 to 1 as the overlap amount. For example, when β is 2 m and βB7 is 1 m, the first analysis part 34 calculates the overlap amount as 0.5. Similarly, for example, when β is 2 m and βH5 is 0.5 m, the first analysis part 34 may calculate the overlap amount as 0.25. The above numerical value is an example, and the present embodiment is not limited thereto. Note that, as shown in FIG. 7, since the first analysis part 34 calculates the risk degree W1 to be greater when the overlap amount becomes greater, the first analysis part 34 calculates the risk degree W1 to be greater when the width of the future location of the object in the overlap region becomes greater.

According to the collision possibility determination apparatus 5 of the fourth embodiment described above, similarly to the first embodiment, it is possible to enhance the determination accuracy of a collision possibility.

Hereinbefore, the embodiments of the invention are described with reference to the accompanying drawings, but the invention is not limited to the embodiments. A variety of changes and substitutions can be made without departing from the scope of the invention.

What is claimed is:

1. A collision possibility determination apparatus comprising:
    an input part that includes at least one of a camera and a radar device; and
    a functional part that includes a processor, the functional part comprising:
        an identifying part programmed to detect an object and identify a location of the object based on information received by the input part;
        a first analysis part programmed to identify a travel direction and a travel speed of the object based on the information received by the input part, to predict a future location of the object based on information relating to the object output from the identifying part, and to generate first information based on the predicted future location of the object, the first information having a value which increases as an overlap amount between the future location of the object and an intended travel path of a vehicle becomes greater;
        a second analysis part programmed to generate second information based on a current location of the object identified by the identifying part, the second information having a value which increases as a lateral distance between the current location of the object and the intended travel path of the vehicle decreases; and
        a determination part programmed to determine a total risk degree related to a possibility of colliding with the object based on both of the first information and the second information.

2. The collision possibility determination apparatus according to claim 1, wherein the collision possibility determination apparatus is provided on a vehicle.

3. The collision possibility determination apparatus according to claim 1, wherein:
    the collision possibility determination apparatus is provided on a vehicle, and
    in a case where a right end portion of the object viewed from the vehicle is on a right side of a first virtual line that extends from a left end of the vehicle in a travel direction of the vehicle and a left end portion of the object viewed from the vehicle is on a left side of a second virtual line that extends from a right end of the vehicle in the travel direction of the vehicle, the first analysis part generates the first information based on a smaller one of a distance between the first virtual line and the right end portion and a distance between the second virtual line and the left end portion.

4. The collision possibility determination apparatus according to claim 1, wherein
    the first analysis part generates the first information by integrating values generated by the first analysis part, and/or
    the second analysis part generates the second information by integrating values generated by the second analysis part.

5. The collision possibility determination apparatus according to claim 1, wherein the first information, the second information, or a determination result by the determination part is adjusted based on a distance between the collision possibility determination apparatus and the object or a collision time between the collision possibility determination apparatus and the object.

6. A drive assist apparatus provided on a vehicle, the drive assist apparatus comprising:

the collision possibility determination apparatus according to claim 1; and a drive assist part configured to perform a drive assist of the vehicle based on a determination result of the determination part of the collision possibility determination apparatus.

7. A collision possibility determination method in a functional part including a processor, said method comprising steps of:

detecting an object and identifying a location of the object based on information received by an input part that includes at least one of a camera and a radar device;

identifying a travel direction and a travel speed of the object based on the information received by the input part and, predicting a future location of the object based on the identified travel direction and the identified travel speed;

generating first information based on the predicted future location of the object, the first information having a value which increases as an overlap amount between the future location of the object and an intended travel path of a vehicle becomes greater;

generating second information based on a current location of the object, the second information having a value which increases as a lateral distance between the current location of the object and the intended travel path of the vehicle decreases; and determining a total risk degree related to a possibility of colliding with the object based on both of the first information and the second information.

8. A collision possibility determination program for causing a computer to:

detect an object and identify a location of the object based on information received by an input part that includes at least one of a camera and a radar device;

identify a travel direction and a travel speed of the object based on the information received by the input part, and predict a future location of the object based on the identified travel direction and the identified travel speed;

generate first information based on the predicted future location of the object, the first information having a value which increases as an overlap amount between the future location of the object and an intended travel path of a vehicle becomes greater;

generate second information based on a current location of the object, the second information having a value which increases as a lateral distance between the current location of the object and the intended travel path of the vehicle decreases; and determine a total risk degree related to a possibility of colliding with the object based on both of the first information and the second information.

\* \* \* \* \*